US012623474B2

(12) United States Patent
Tsubaki et al.

(10) Patent No.: US 12,623,474 B2
(45) Date of Patent: May 12, 2026

(54) RECORDING-HEAD POSITION ADJUSTMENT MECHANISM, RECORDING-HEAD MODULE, AND IMAGE FORMING APPARATUS

(71) Applicants: Kengo Tsubaki, Kanagawa (JP); Yuuya Nakazawa, Kanagawa (JP)

(72) Inventors: Kengo Tsubaki, Kanagawa (JP); Yuuya Nakazawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 139 days.

(21) Appl. No.: 18/505,417

(22) Filed: Nov. 9, 2023

(65) Prior Publication Data

US 2024/0157717 A1 May 16, 2024

(30) Foreign Application Priority Data

Nov. 14, 2022 (JP) ................................ 2022-181685

(51) Int. Cl.
*B41J 25/00* (2006.01)
*B41J 25/316* (2006.01)

(52) U.S. Cl.
CPC ........... *B41J 25/003* (2013.01); *B41J 25/316* (2013.01); *B41J 2025/008* (2013.01); *B41J 2202/21* (2013.01)

(58) Field of Classification Search
CPC .. B41J 25/003; B41J 25/316; B41J 2025/008; B41J 2202/21
See application file for complete search history.

(56) References Cited

U.S. PATENT DOCUMENTS

| | | | |
|---|---|---|---|
| 2009/0263155 A1 | 10/2009 | Murano | |
| 2011/0050814 A1 | 3/2011 | Tsubaki et al. | |
| 2011/0181670 A1 | 7/2011 | Tsubaki | |
| 2012/0062659 A1 | 3/2012 | Tsubaki | |
| 2012/0147094 A1* | 6/2012 | Hagiwara | B41J 25/003 29/890.1 |
| 2013/0235131 A1 | 9/2013 | Watanabe et al. | |
| 2014/0063141 A1 | 3/2014 | Tsubaki et al. | |
| 2015/0076124 A1 | 3/2015 | Tsubaki et al. | |
| 2015/0258815 A1 | 9/2015 | Tsubaki et al. | |
| 2016/0096377 A1 | 4/2016 | Katoh et al. | |
| 2019/0061396 A1* | 2/2019 | Suzuki | B41J 2/21 |
| 2019/0077158 A1 | 3/2019 | Tsubaki | |

(Continued)

FOREIGN PATENT DOCUMENTS

| | | | |
|---|---|---|---|
| JP | 2009-042735 A | 2/2009 | |
| JP | 2009040017 A * | 2/2009 | B41J 2/01 |

(Continued)

*Primary Examiner* — Yaovi M Ameh
(74) *Attorney, Agent, or Firm* — Harness, Dickey & Pierce, P.L.C.

(57) ABSTRACT

A recording-head position adjustment mechanism includes a supporting member supporting a recording head that discharges a liquid droplet, the recording head including an abutting portion. The recording-head position adjustment mechanism includes a positioner on which the abutting portion abuts, the positioner to which the abutting portion is fixed so as to determine a position of the recording head in a longitudinal direction of the recording head with respect to the supporting member. A position of the positioner in the longitudinal direction with respect to the supporting member is adjustable.

9 Claims, 6 Drawing Sheets

(56) References Cited

U.S. PATENT DOCUMENTS

| | | | |
|---|---|---|---|
| 2021/0162784 | A1 | 6/2021 | Tsubaki |
| 2022/0169055 | A1 | 6/2022 | Tsubaki |
| 2023/0034705 | A1 | 2/2023 | Tsubaki |

FOREIGN PATENT DOCUMENTS

| | | | |
|---|---|---|---|
| JP | 2009-258457 | A | 11/2009 |
| JP | 2019-038231 | A | 3/2019 |
| JP | 2019-142030 | A | 8/2019 |
| JP | 2021-091210 | A | 6/2021 |
| JP | 2022-085395 | A | 6/2022 |
| JP | 2023-019141 | A | 2/2023 |

* cited by examiner

RECORDING-HEAD POSITION ADJUSTMENT MECHANISM, RECORDING-HEAD MODULE, AND IMAGE FORMING APPARATUS

CROSS-REFERENCE TO RELATED APPLICATION

This patent application is based on and claims priority pursuant to 35 U.S.C. § 119(a) to Japanese Patent Application No. 2022-181685, filed on Nov. 14, 2022, in the Japan Patent Office, the entire disclosure of which is hereby incorporated by reference herein.

BACKGROUND

Technical Field

Embodiments of the present disclosure relate to a recording-head position adjustment mechanism to adjust a position of a recording head that discharges a liquid droplet, and further relate to a recording-head module and an image forming apparatus, including the recording-head position adjustment mechanism.

Related Art

In an image forming apparatus, such as an inkjet printer, a technique is widely known in the art that adjusts the positions of recording heads to form a good image.

Specifically, the image forming apparatus includes the recording heads (printing modules) for a plurality of colors that are arranged so as to face a sheet conveyed by a conveyor. The recording heads for the plurality of colors discharge liquid droplets toward the conveyed sheet to form a desired color image on the sheet.

A technique is known in which an angle adjustment mechanism (discharge angle adjustment mechanism) adjusts an angle of the recording heads to arrange the recording heads with respect to a drum with high accuracy.

SUMMARY

An embodiment of the present disclosure includes a recording-head position adjustment mechanism. The recording-head position adjustment mechanism includes a supporting member supporting a recording head that discharges a liquid droplet, the recording head including an abutting portion. The recording-head position adjustment mechanism includes a positioner on which the abutting portion abuts, the positioner to which the abutting portion is fixed so as to determine a position of the recording head in a longitudinal direction of the recording head with respect to the supporting member. A position of the positioner in the longitudinal direction with respect to the supporting member is adjustable.

An embodiment of the present disclosure includes a recording-head module including a recording head to discharge a liquid droplet, and the recording-head position adjustment mechanism described above. The recording head and the recording-head position adjustment mechanism are unitized.

An embodiment of the present disclosure includes an image forming apparatus including a recording head to discharge a droplet, and the recording-head position adjustment mechanism described above.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
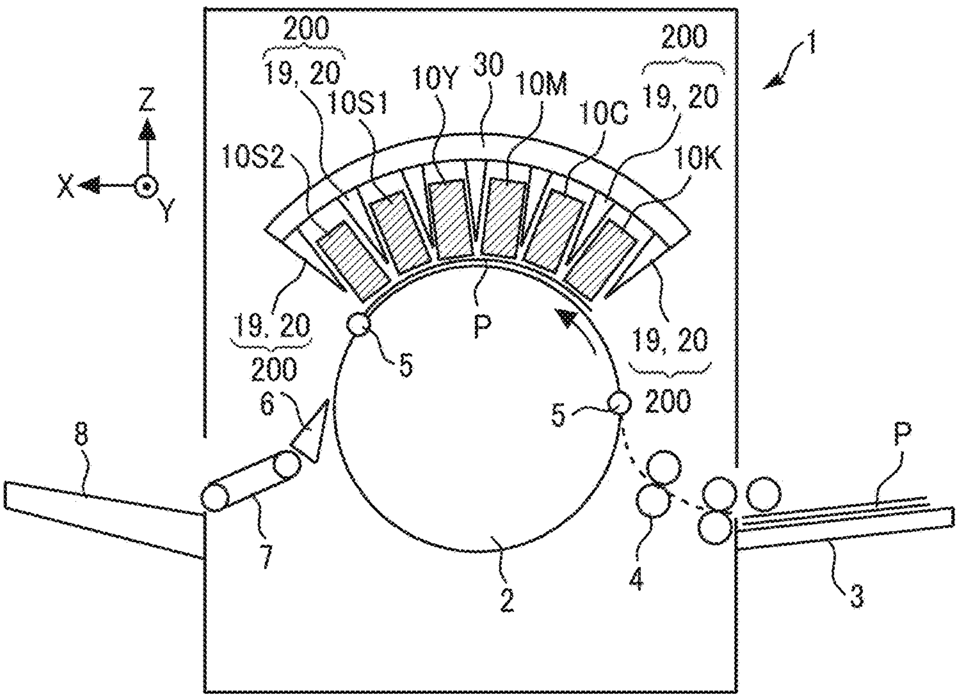
FIG. 1 is a diagram illustrating an overall configuration of an image forming apparatus, according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Embodiments of the present disclosure are described in detail with reference to the accompanied drawings. In the drawings, like reference signs denote like elements, and redundant description may be appropriately simplified or omitted.

The overall configuration and operation of an image forming apparatus 1 according to the present embodiment is described below with reference to FIG. 1.

In FIG. 1, the image forming apparatus 1 is illustrated as an inkjet printer. The image forming apparatus 1 includes a conveyance drum 2 as a conveyor to convey a sheet P, a sheet tray 3 on which sheets P on which printing is to be performed are stacked, and grippers 5 to grip the sheet P on the conveyance drum 2.

The image forming apparatus 1 further includes a separator 6 to separate the sheet P from the conveyance drum 2, a conveyance belt 7 to convey the sheet P separated from the conveyance drum 2, and an output tray 8 onto which the printed sheet P is ejected and stacked.

The image forming apparatus 1 further includes recording heads (printing modules) 10Y, 10M, 10C, 10K, 10S1, and 10S2 serving as image forming units for printing, e.g., letters and images by an inkjet method, supporting members 200 to support (suspend) the recording heads 10Y, 10M, 10C, 10K, 10S1, and 10S2, and a base frame 30 to hold the supporting members 200. The supporting member 200 includes a first support 19 and a second support 20.

The image forming apparatus 1 according to the present embodiment forms a color image. As illustrated in FIG. 1, the image forming apparatus 1 includes the recording head 10K for black, the recording heads 10Y, 10M, and 10C for three colors (yellow, magenta, and cyan), and the recording heads 10S1 and 10S2 for coating (two spot colors). The six recording heads 10Y, 10M, 10C, 10K, 10S1, and 10S2 are opposed to the conveyance drum 2 and arranged side by side in the direction of rotation of the conveyance drum 2. In other words, the plurality of recording heads 10Y, 10M, 10C, 10K, 10S1, and 10S2 and a plurality of recording-head position adjustment mechanisms described below are radially arranged side by side in the direction (or a conveyance direction of the sheet P) intersecting a longitudinal direction of the recording heads 10Y, 10M, 10C, 10K, 10S1, and 10S2 (may be collectively referred to as "recording heads 10" in the following description). The longitudinal direction is perpendicular to the surface of the paper on which FIG. 1 is drawn. In the following description, "the longitudinal direction" refers to that of the recording heads 10 unless otherwise specified.

Since the six recording heads 10Y, 10M, 10C, 10K, 10S1, and 10S2 have substantially the same structure except that the colors (types) of inks used for printing are different, the suffixes Y, M, C, K, S1, and S2 attached to the reference numeral of the recording head 10 are omitted in, for example, FIG. 2, FIG. 3, FIG. 4A, and FIG. 4B.

Figure 2:
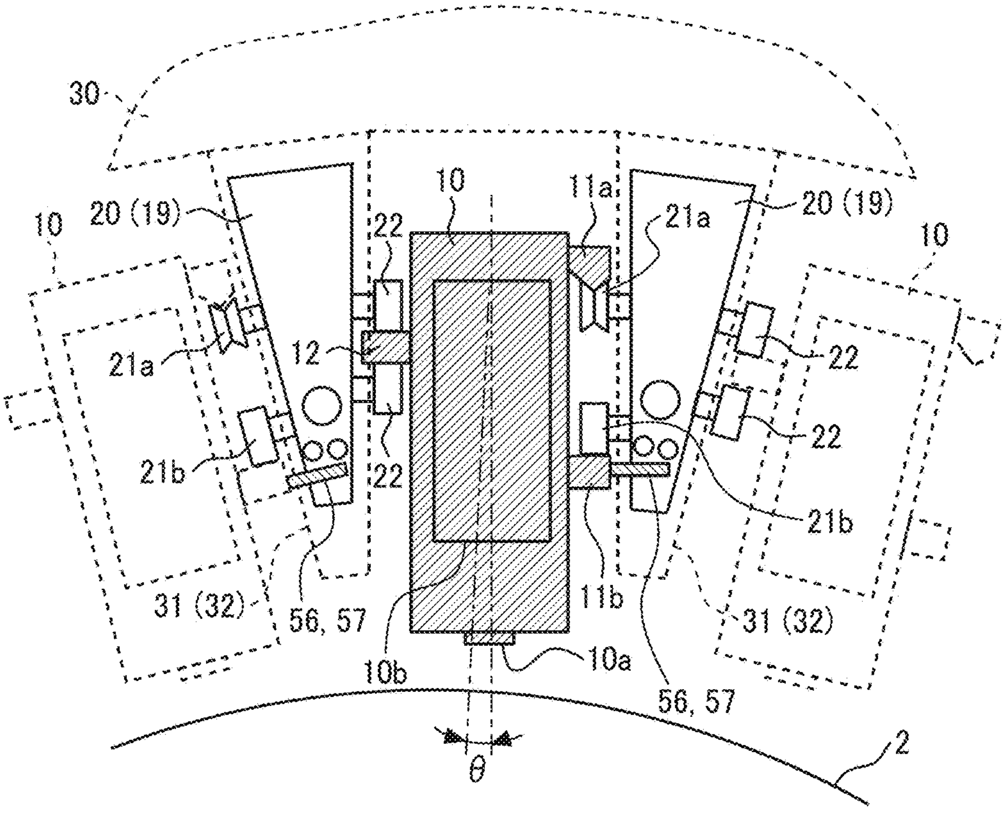
FIG. 2 is a schematic view of a recording head suspended by a supporting member, according to an embodiment of the present disclosure.

For the sake of understanding the recording head 10, the recording head 10 indicated by a solid line is not inclined in FIG. 2, but in reality, as illustrated in FIG. 1 (or FIG. 12), all of six recording heads 10Y, 10M, 10C, 10K, 10S1, and 10S2 are inclined in the image forming apparatus 1.

As illustrated in FIG. 2, a main part of the recording head 10 includes, for example, a piezoelectric actuator and a thermal actuator, and further includes a nozzle 10*a* to discharge ink as liquid droplets, an ink tank 10*b* filled with ink, and a control board (controller).

The operation of the image forming apparatus 1 is briefly described with reference to FIG. 1.

First, when a print command is input together with image data from, e.g., a personal computer to the controller of the image forming apparatus 1, the sheet P is fed from the sheet tray 3 by a sheet feed roller. The sheet P fed from the sheet tray 3 is conveyed toward the conveyance drum 2 by a conveyance roller pair 4. Meanwhile, in the recording heads 10Y, 10M, 10C, 10K, 10S1, and 10S2 for the respective colors, the input image data are converted into writing data of the respective colors.

The sheet P conveyed to the conveyance drum 2 is gripped by the gripper 5 and positioned on the conveyance drum 2. The conveyance drum 2 conveys the sheet P while rotating counterclockwise.

As the conveyance drum 2 rotates, the sheet P is conveyed in the direction indicated by arrow A1 in FIG. 1. The recording heads 10Y, 10M, 10C, 10K, 10S1, and 10S2 sequentially discharge inks of the respective colors as liquid droplets onto the sheet P according to the writing data. Thus, a desired image is formed on the sheet P.

The sheet P, on which the desired image has been formed, is separated from the conveyance drum 2 by the separator 6. The sheet P separated from the conveyance drum 2 is conveyed by the conveyance belt 7 and ejected onto the output tray 8.

A description is given of a recording-head position adjustment mechanism to adjust the position of the recording head 10 that discharges ink (liquid droplets) in the image forming apparatus 1 having such a configuration.

The recording-head position adjustment mechanism according to the present embodiment includes discharge angle adjusters 56 and 57, and a longitudinal-direction position adjuster including a positioner 40, a spacer 41, and a fixing screw 45. The discharge angle adjusters 56 and 57 adjust a direction of liquid droplets discharged from the nozzle 10*a* of the recording heads 10Y, 10M, 10C, 10K, 10S1, and 10S2 (i.e., a discharge angle θ, see FIG. 2). The longitudinal-direction position adjuster adjusts the positions of the recording heads 10Y, 10M, 10C, 10K, 10S1, and 10S2 in the longitudinal-direction of the recording heads.

As illustrated in, for example, FIG. 2, FIG. 3, FIG. 4A, and FIG. 4B, the image forming apparatus 1 includes the supporting members 200 (see FIG. 1) including the first support 19 and the second support 20 to support the recording head 10. The recording head 10 can be drawn out in a predetermined direction (i.e., +Y direction in FIG. 3).

In other words, the recording head 10 is detachably (exchangeably) installed with respect to the image forming apparatus 1 so that the recording head 10 can be drawn out from the image forming apparatus 1 in the +Y direction or installed to the image forming apparatus 1 in a direction −Y direction, which is opposite the +Y direction. When ink stored in the ink tank 10*b* is depleted, the recording head 10 is drawn out, and a new recording head 10 is installed for replacement.

The recording-head position adjustment mechanism includes the first support 19 and the second support 20. The first support 19 supports one end of the recording head 10 in the longitudinal direction (i.e., a first predetermined position). The second support 20 supports the other end of the recording head 10 in the longitudinal direction (i.e., a second predetermined position different from the first predetermined position). In the following, the one end of the recording head 10 in the longitudinal direction thereof is referred to as a "first end," and the other end of the recording head 10 is referred to as a "second end."

The recording head 10 is removably installed in the longitudinal direction (i.e., an installation direction). The longitudinal direction, which is ±Y directions, is substantially perpendicular to the conveyance direction of the sheet P indicated by the blank arrow in FIG. 3.

Figure 3:
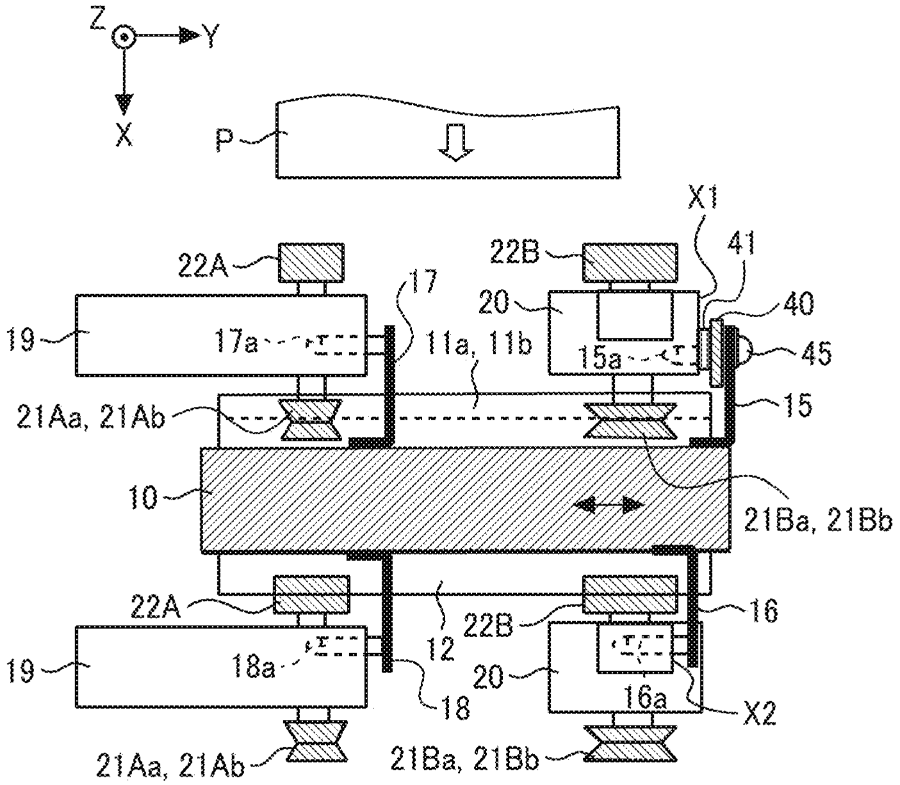
FIG. 3 is a top view of the recording head supported by a first support and a second support of the supporting member, according to an embodiment of the present disclosure.

Specifically, the supporting member 200 includes a pair of the first supports 19 and a pair of the second supports 20 sandwiching the recording head 10 in the substantially horizontal direction. In the present embodiment, as illustrated in FIG. 3, the supporting member 200 is divided into the pair of the first supports 19 to support the first end of the recording head 10 in the longitudinal direction and the pair of the second supports 20 to support the second end of the recording head 10 in the longitudinal direction. The first end is the back side of the recording head 10, and the second end is the front side of the recording head 10 in the installation direction. In other words, the first support 19 includes a first support portion at the first end and a second support portion at the first end in the longitudinal direction. The second support 20 includes a first support portion at the second end and a second support portion at the second end in the longitudinal direction. The first support portion at the first end of one first support 19 and the second support portion at the first end of the other first support 19 sandwiches the first end of the recording head 10. The first support portion at the second end of one second support 20 and the second support portion at the second end of the other second support 20 sandwiches the second end of the recording head 10. Thus, the supporting member 200 including the pair of the first supports 19 and the pair of the second supports 20 supports the recording head 10.

As illustrated in, for example, FIG. 3, in the first support 19, a first upper grooved roller 21Aa and a first lower columnar roller 21Ab serve as the first support portion at the first end, and two first columnar rollers 22A serve as the second support portion at the first end. The first upper grooved roller 21Aa and the first lower columnar roller 21Ab engage and support one end of the recording head 10 in a transverse direction of the recording head 10 at the first end in the longitudinal direction. The first columnar rollers 22A support the other end of the recording head 10 in the transverse direction at the first end in the longitudinal direction so that the recording head 10 is movable on the first columnar rollers 22A. In the following, the one end of the recording head 10 in the transverse direction thereof is referred to as a "first edge," and the other end of the recording head 10 is referred to as a "second edge." The first support 19 is fixed to the image forming apparatus 1 (side frame 31), and the discharge angle adjusters 56 and 57 described below, are installed in the first support 19.

In substantially the same manner, the second support 20 includes a second upper grooved roller 21Ba and a second lower columnar roller 21Bb serving as the first support portion at the second end, and two second columnar rollers 22B serving as the second support portion at the second end. The second upper grooved roller 21Ba and the second lower columnar roller 21Bb engage and support the first edge of the recording head 10 in the transverse direction at the second end in the longitudinal direction. The second columnar rollers 22B support the second edge of the recording head 10 in the transverse direction at the second end in the longitudinal direction so that the recording head 10 is movable on the second columnar rollers 22B. The discharge angle adjuster 56 described below is installed in the second support 20.

Specifically, the recording head 10 includes a ridged rail 11*a* and a flat rail 11*b* as a first slider at the first edge and a flat rail 12 as a second slider at the second edge in the transverse direction. The transverse direction is perpendicular to the longitudinal direction and substantially the same as the conveyance direction of the sheet P. The ridged rail 11*a* and the flat rail 11*b* are disposed vertically apart. As illustrated in FIG. 2, the ridge rail 11*a* has a guide surface with a V-shaped projection, and each of the flat rail 11*b* and the flat rail 12 has a flat guide surface. The ridged rail 11*a*, the flat rail 11*b*, and the flat rail 12 extend in the installation direction in which the recording head 10 is removably installed (i.e., ±Y directions).

The first upper grooved roller 21Aa and the second upper grooved roller 21Ba have a V-shaped groove on the outer circumferential surface and are rotatably supported by the first support 19 and the second support 20. The first lower columnar roller 21Ab, the second lower columnar roller 21Bb, the first columnar rollers 22A, and the second columnar rollers 22B have a flat outer circumferential surface and are rotatably supported by the first support 19 and the second support 20.

The first upper grooved roller 21Aa and the first lower columnar roller 21Ab (first support portion at the first end) disposed vertically apart engage the ridged rail 11*a* and the flat rail 11*b* (first slider) disposed vertically apart on the recording head 10, respectively. The two first columnar rollers 22A (second support portion at the first end) contact the flat rail 12 (second slider) of the recording head 10 so as to sandwich the flat rail 12 from above and below.

In substantially the same manner, the second upper grooved roller 21Ba and the second lower columnar roller 21Bb (first support portion at the second end) disposed vertically apart engage the ridged rail 11*a* and the flat rail 11*b* disposed vertically apart on the recording head 10, respectively. The second columnar rollers 22B (second support portion at the second end) contact the flat rail 12 of the recording head 10 so as to sandwich the flat rail 12 (second slider) from above and below.

While the first upper grooved roller 21Aa, the first lower columnar roller 21Ab, the second upper grooved roller 21Ba, the second lower columnar roller 21Bb, the first columnar rollers 22A, and the second columnar rollers 22B rotate, the ridged rail 11*a* and the flat rail 11*b*, and the flat rail 12 move on the first upper grooved roller 21Aa, the first lower columnar roller 21Ab, the second upper grooved roller 21Ba, the second lower columnar roller 21Bb, the first columnar rollers 22A, and the second columnar rollers 22B. Thus, the recording head 10 is removably installed in ±Y directions.

As illustrated in, for example, FIG. 2 and FIG. 3, in the present embodiment, the first support 19 includes other first columnar rollers 22A disposed on the opposite side of the portion where the first upper grooved roller 21Aa and the first lower columnar roller 21Ab as the first support portion at the first end are disposed so as to support another recording head adjacent to the recording head 10.

In substantially the same manner, the second support 20 includes other second columnar rollers 22B disposed on the opposite side of the portion where the second upper grooved roller 21Ba and the second lower columnar roller 21Bb as the first support portion at the second end are disposed so as to support another recording head 10 adjacent to the recording head 10.

With such a configuration, the plurality of the recording heads 10Y, 10M, 10C, 10K, 10S1, and 10S2 can be compactly installed in the image forming apparatus 1 in the conveyance direction of the sheet P.

The recording-head position adjustment mechanism according to the present embodiment includes the discharge angle adjusters 56 and 57 that adjust a direction of liquid droplets discharged from the nozzle 10*a* of the recording head 10 (i.e., the discharge angle θ, see FIG. 2). The discharge angle adjusters 56 and 57 move the recording head 10 in a direction intersecting the longitudinal direction of the recording head 10 (substantially the same direction as the conveyance direction of the sheet P and the transverse direction) to swing the lower portion of the recording head 10 around a portion supported by the first upper grooved roller 21Aa and the second upper grooved roller 21Ba (upper support) as a fulcrum, thus adjusting the direction (discharge angle θ) of the liquid droplets discharged from the recording head 10 to be directed to the center of the conveyance drum 2. In other words, when the discharge angle θ is adjusted, the recording head 10 is swung around the longitudinal axis with the V-shaped groove of the first upper grooved roller 21Aa and the second upper grooved roller 21Ba (upper support) as a fulcrum by the discharge angle adjusters 56 and 57.

Specifically, as illustrated in, for example, FIG. 2, in the present embodiment, the discharge angle adjusters 56 and 57 are disposed near the first lower columnar roller 21Ab and the second lower columnar roller 21Bb (lower supports), respectively. More specifically, the discharge angle adjusters 56 and 57 includes adjustment rollers to push the flat rail 11*b* attached to the lower portion of the recording head 10, respectively.

As a result, the recording head 10 can be efficiently swung with the portion supported by the first upper grooved roller 21Aa and the second upper grooved roller 21Ba (upper supports) as a fulcrum, and the discharge angle θ can be efficiently adjusted.

The discharge angle adjusters 56 and 57 are not limited to the above-described embodiments, and various types of configurations can be used.

The recording-head position adjustment mechanism according to the present embodiment may further include an inclination adjustment mechanism to adjust the inclination of the recording heads 10Y, 10M, 10C, 10K, 10S1, and 10S2 in the longitudinal direction.

Such an inclination adjustment mechanism moves the second support 20 in the direction intersecting the longitudinal direction (i.e., the direction of conveyance of the sheet P and the transverse direction) with respect to the first support 19 to adjust the inclination of the recording head 10.

Specifically, the inclination adjustment mechanism includes an inclination adjustor to move the second upper grooved roller 21Ba and the second lower columnar roller 21Bb (the first support portion at the second end) in the transverse direction intersecting the longitudinal direction. Accordingly, the first edge in the transverse direction of the recording head 10 at the second end in the longitudinal direction is moved following the movement of the second upper grooved roller 21Ba and the second lower columnar roller 21Bb. As a result, the recording head 10 is swung around the first end in the longitudinal direction (i.e., the position of the first upper grooved roller 21Aa and the first lower columnar roller 21Ab), thus adjusting the inclination of the recording head 10.

The configuration of the recording-head position adjustment mechanism according to the present embodiment is described below.

The recording-head position adjustment mechanism according to the present embodiment includes, in addition to the above-described discharge angle adjusters 56 and 57, the longitudinal-direction position adjuster including the positioner 40, the spacer 41, and the fixing screw 45. The longitudinal-direction position adjuster adjusts the position of the recording head 10 in the longitudinal direction.

As described above, the recording-head position adjustment mechanism according to the present embodiment includes the supporting member 200, i.e., the first support 19 and the second support 20 to support the recording head 10. The first support 19 includes the first upper grooved roller 21Aa and the first lower columnar roller 21Ab which serve as the first support portion at the first end, and the first columnar rollers 22A which serve as the second support portion at the first end. The second support 20 includes the second upper grooved roller 21Ba and the second lower columnar roller 21Bb which serve as the first support portion at the second end, and the second columnar rollers 22B which serve as the second support portion at the second end.

Figure 4A:
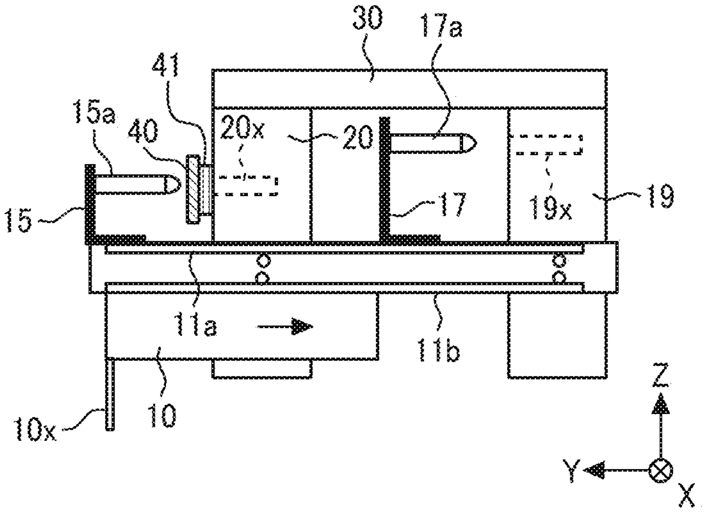
FIG. 4A and FIG. 4B are schematic diagrams illustrating an operation of attaching the recording head to a supporting member of a body of the image forming apparatus, according to an embodiment of the present disclosure.
Figure 4B:
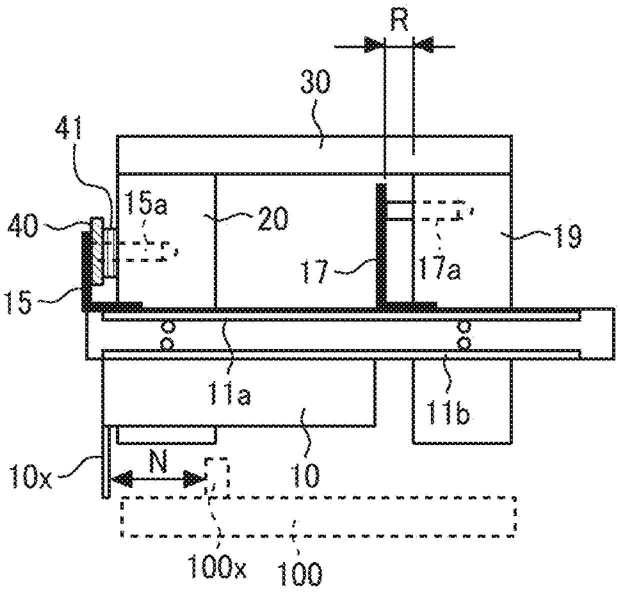
Figure 5:
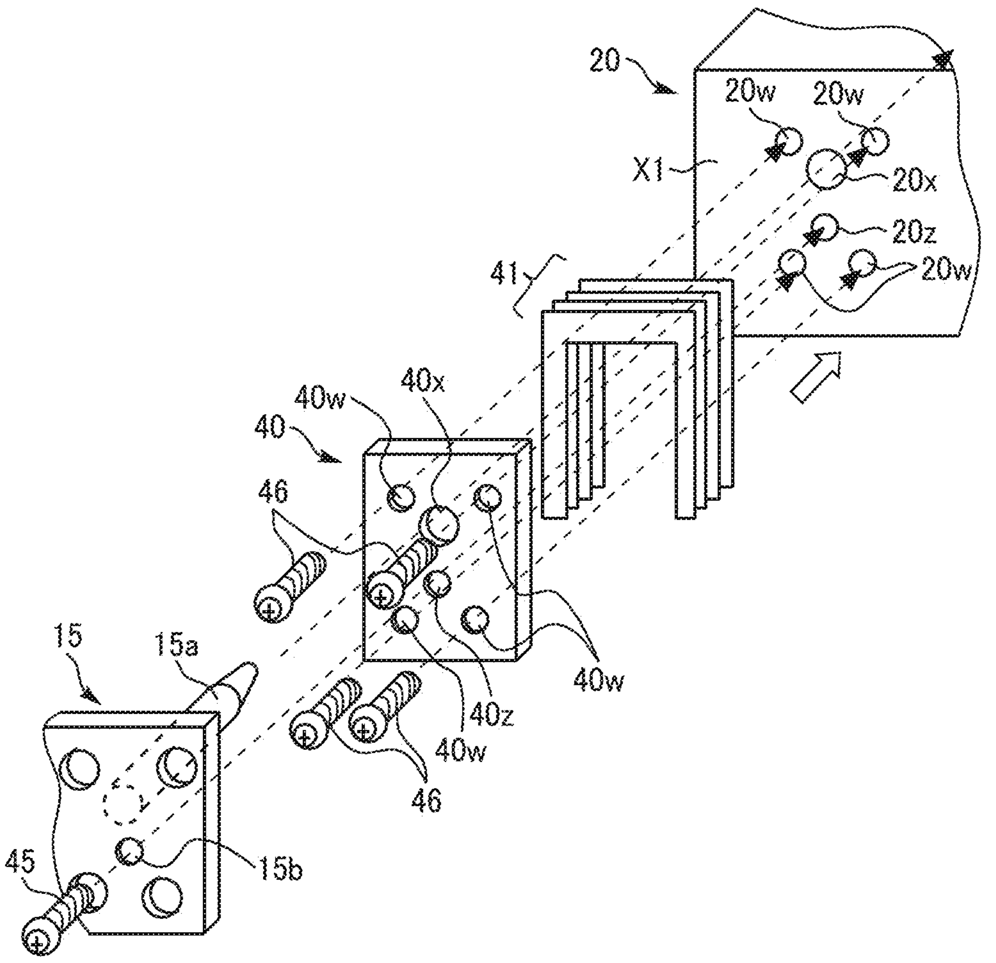
FIG. 5 is a perspective view of an abutting portion, a positioner, and a spacer of the recording head attached to the supporting member, according to an embodiment of the present disclosure.

As illustrated in, for example, FIG. 3 to FIG. 5, the longitudinal-direction position adjuster (recording-head position adjustment mechanism) according to the present embodiment includes the positioner 40 (positioning plate) on which an abutting portion 15 (abutting plate) of the recording head 10 abuts and is fixed so as to determine the position of the recording head 10 in the longitudinal direction (±Y direction) with respect to the first support 19 and the second support 20 (the body of the image forming apparatus 1). In other words, the positioner 40 against which the abutting portion 15 of the recording head 10 abuts is fixed so as to determine the position of the recording head 10 in the longitudinal direction with respect to the first support 19 and the second support 20.

The longitudinal-direction position adjuster (recording-head position adjustment mechanism) can adjust the position of the positioner 40 in the longitudinal direction of recording head 10 with respect to the first support 19 and the second support 20 (the body of the image forming apparatus 1).

Specifically, the positioner 40 is provided only on one support portion (i.e., the second support 20 to which the second upper grooved roller 21Ba and the second lower columnar roller 21Bb serving as the first support portion at the second end are installed, see FIG. 5) among the first support portion at the first end including the first upper grooved roller 21Aa and the first lower columnar roller 21Ab, the second support portion at the first end including the first columnar rollers 22A, the first support portion at the second end including the second upper grooved roller 21B a and the second lower columnar roller 21Bb, and the second support portion at the second end including the second columnar rollers 22B. The positioner 40 is a plate-like member made of a metal material.

The positioner 40 is fixable to the second support 20 with the spacer 41 interposed between the positioner 40 and the second support 20 (support). Specifically, as illustrated in FIG. 5, second fixing screws 46 are respectively screwed into four second female screw 40*w* of the second support 20 via four third through-holes 20*w* of the positioner 40 with the spacer 41 interposed between the positioner 40 and the second support 20. Thus, the positioner 40 is fixed to the second support 20.

Further, the abutting portion 15 includes a first pin 15*a* that engages a first hole 20*x* formed in the second support 20 (one support portion) via a through-hole 40*x* (first through-hole) formed in the positioner 40. The abutting portion 15 is a substantially plate-like member made of a metal material, and is installed in the upper portion of the recording head 10 at the second end in the in the longitudinal direction and the first edge in the transverse direction.

The abutting portion 15 is fixable to the second support 20 via the positioner 40 and the spacer 41. Specifically, as illustrated in FIG. 5, the fixing screw 45 is screwed into a first female screw 20*z* of the second support 20 via a through-hole 15*b* of the abutting portion 15 and a second through-hole 40*z* of the positioner 40 with the positioner 40 and the spacer 41 interposed between the abutting portion 15 and the second support 20. Thus, the abutting portion 15 is fixed to the second support 20.

In the present embodiment, the position of the positioner 40 in the longitudinal direction with respect to the second support 20 (support) is adjusted by adjusting the number of the spacers 41 having the same thickness (four in the example of FIG. 5).

Specifically, the spacer 41 is made of a metal material and has a thickness of approximately 0.3 mm to 0.6 mm (0.5 mm in the present embodiment). The standard number (reference setting) of the spacers 41 is five, and the position of the recording head 10 in the longitudinal direction is adjusted by increasing or decreasing the number as needed.

More specifically, the position of the recording head 10 in the longitudinal direction is adjusted by adjusting the number of the spacers 41 so that a distance N between a reference portion 100*x* of a jig 100 (see FIG. 4B) installed on the conveyance drum 2 and a reference pin 10*x* installed at the recording head 10 is a target value in the manufacturing process of the image forming apparatus 1 or when replacing the recording head 10. The reference pin 10*x* function as a vibration preventing pin (see FIG. 4A and FIG. 4B) For example, when the target distance N is 10 mm and the actually measured distance N' is 9 mm, the number of the spacers 41 is increased from the standard number of five to seven so as to fill the shortage 1 mm. By contrast, when the actually measured distance N' is 11 mm, the number of spacers 41 is reduced from the standard number of five to three so as to eliminate the excess 1 mm.

In the present embodiment, the position of the positioner 40 in the longitudinal direction with respect to the second support 20 is adjusted by adjusting the number of the spacers 41 having the same thickness. Alternatively, the position of the positioner 40 in the longitudinal direction with respect to the second support 20 may be adjusted by selecting one or more spacers from multiple spacers having different thicknesses.

As described above, since the recording-head position adjustment mechanism according to the present embodiment can adjust the position of the positioner 40 in the longitudinal direction with respect to the second support 20, the position of the recording head 10 in the longitudinal direction is accurately adjusted. Accordingly, an image is accurately formed on the sheet P at a target position in the longitudinal direction by the recording head 10.

Specifically, the effects of the above-described embodiment are described in more detail with reference to FIG. 6A and FIG. 6B.

Figure 6A:
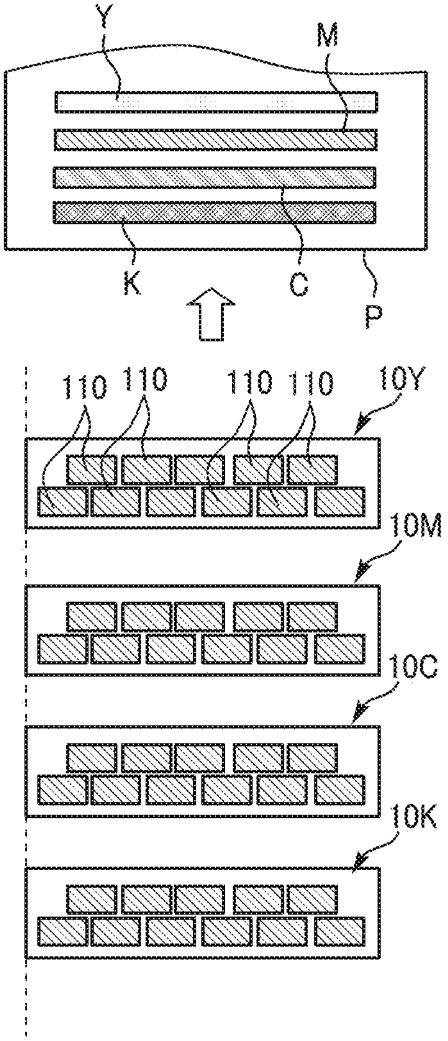
FIG. 6A is a view of the plurality of recording heads aligned with each other in the longitudinal direction of the recording heads, according to an embodiment of the present disclosure.
Figure 6B:
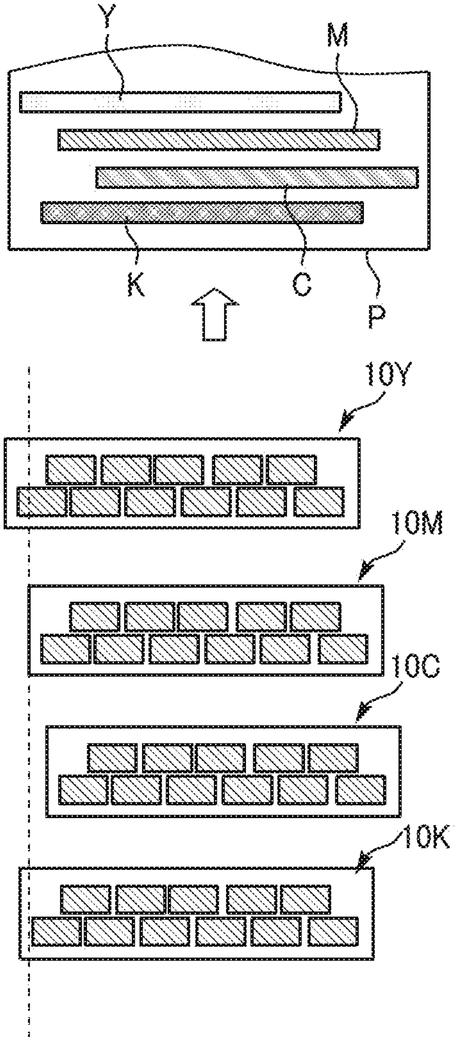
FIG. 6B is a view of the plurality of recording heads not aligned with each other in the longitudinal direction, according to an embodiment of the present disclosure.

As a modification of the above embodiment of the present disclosure, FIG. 6A and FIG. 6B are top views of the arrangement of four array-type recording heads 10Y, 10M, 10C, and 10K in the direction of conveyance of the sheet P indicated by the blank arrow.

In the above-described embodiment, each of the six recording heads 10Y, 10M, 10C, 10K, 10S1, and 10S2 includes a single head longer than the width of the sheet P. In the modification, the array-type recording heads 10Y, 10M, 10C, and 10K illustrated in FIG. 6A and FIG. 6B are arranged in parallel. Unlike the above-describe embodiment, each of the array-type recording heads 10Y, 10M, 10C, and 10K includes a plurality of heads 110 (11 heads in FIG. 6A and FIG. 6B).

As illustrated in FIG. 6A, when the positions of the recording heads 10Y, 10M, 10C, and 10K in the longitudinal direction (the left-right direction in the figure) are adjusted to target positions by the recording-head position adjustment mechanism described above (i.e., when the end faces of the recording heads are located at the positions indicated by the broken lines in the figure), images of the colors Y, M, C, and K are formed on the sheet P without misalignment in the longitudinal direction. By contrast, when the positions of the recording heads 10Y, 10M, 10C, and 10K in the longitudinal direction are not adjusted to the target positions, the misalignment in the longitudinal direction occurs in the images of the colors Y, M, C, and K formed on the sheet P. Accordingly, in an image formed by overlapping the images of the colors Y, M, C, and K, a color shift occurs. These principles are not limited to the case where the array-type recording head 10 is used as illustrated in FIG. 6A and FIG. 6B, but are common to the case where the recording head 10 of the present embodiment is used.

As illustrated in, for example, FIG. 3, the recording head 10 includes second pins 16*a* to 18*a*. The second pins 16*a* to 18*a* are respectively fitted to second holes with clearance R (see FIG. 4B) from the root portions of the second pins 16*a* to 18*b*. The second holes are formed respectively in three support portions (the second support 20 on the lower side in FIG. 3 and the two first supports 19). The three support portions are support portions among the first support portion at the first end including the first upper grooved roller 21Aa and the first lower columnar roller 21Ab, the second support portion at the first end including the first columnar rollers 22A, the first support portion at the second end including the second upper grooved roller 21Ba and the second lower columnar roller 21Bb, and the second support portion at the second end including the second columnar rollers 22B, except for one support portion (the second support 20 on which the first support portion at the second end including the second upper grooved roller 21Ba and the second lower columnar roller 21Bb is installed, see FIG. 5).

Specifically, the recording head 10 includes a first auxiliary plate 16 in the upper portion at the second end in the longitudinal direction and at the second edge in the transverse direction. The first auxiliary plate 16 includes the second pin 16*a*. The recording head 10 further includes a second auxiliary plate 17 in the upper portion at the first end in the longitudinal direction and at the first edge in the transverse direction. The second auxiliary plate 17 includes the second pin 17*a*. The recording head 10 further includes a third auxiliary plate 18 in the upper portion at first end in the longitudinal direction and at the second edge in the transverse direction. The third auxiliary plate 18 includes the second pin 18*a*. The first auxiliary plate 16, the second auxiliary plate 17, and the third face the first supports 19 and the second support 20 respectively with the clearance R therebetween, without contacting the first supports 19 and the second support 20. In other words, only the abutting portion 15 tightly contacts the second support 20 via the positioner 40 and the spacer 41, while the first auxiliary plate 16, the second auxiliary plate 17, and the third auxiliary plate 18 do not tightly contact the first supports 19 and the second support 20.

As described above, in the present embodiment, four pins (one first pin 15*a* and three second pins 16*a* to 18*a*) are fitted into the hole portions (one first hole 20*x* and the three second holes) of the first support 19 and the second support 20.

Accordingly, in the recording head 10 supported by the rollers 21*a*, 21*b*, and 22 of the first support 19 and the second support 20, the four pin (i.e., the first pin 15*a* and the second pins 16*a* to 18*a*) are respectively fitted into the four holes, and thus the recording head 10 is more firmly supported by the first support 19 and the second support 20.

With reference to FIG. 4A and FIG. 4B, the four pins (i.e., the first pin 15*a* and the second pin 16*a* to 18*a*) are fitted into and released from the four holes in conjunction with the operation of installing and removing the recording head 10 with respect to the body of the image forming apparatus 1 (the first support 19 and the second support 20).

Further, the abutting portion 15 (abutting plate), the first auxiliary plate 16, the second auxiliary plate 17, and the third auxiliary plate 18 are formed so as to project in the upward direction from the recording head 10. Further, as illustrated in FIG. 4A and FIG. 4B, the positions in the height direction of the first pins 15*a* and the second pin 17*a* (the second pin 16*a* and the second pin 18*a*) disposed on both sides in the longitudinal direction do not match. Such a configuration does not interfere with the operation of installing and removing the recording head 10 to and from the body of the image forming apparatus 1 (the first support 19 and the second support 20).

In the present embodiment, among the four pins, i.e., the first pin 15*a* and the second pin 16*a* to 18*a*, only one pin, i.e., the first pin 15*a* is fitted to the second support 20 without a clearance, and the other pins, i.e., the second pins 16*a* to 18*a* are fitted to the first support 19 and the second support 20 with the clearances R.

Figure 7:
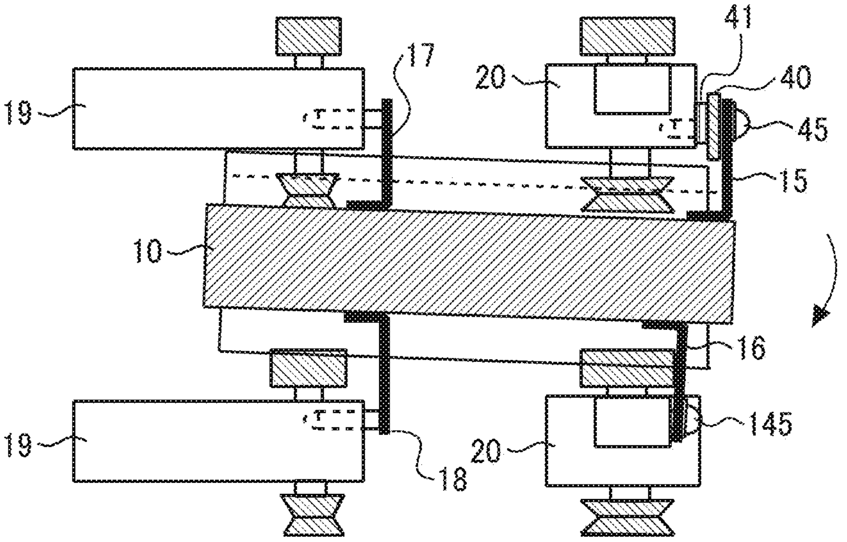
FIG. 7 is a view of a recording-head position adjustment mechanism as a comparative example.

FIG. 7 illustrates a comparative example of an image forming apparatus (a recording-head position adjustment mechanism) in which multiple pins, i.e., the first pin 15*a* and the second pin 18*a* among the four pins, i.e., the first pin 15*a* and the second pin 16*a* to 18*a* are fitted to the second supports 20 without clearances, and thus the recording head 10 is supported by the first support 19 and the second support 20 is inclined with respect to the longitudinal direction. By contrast, the image forming apparatus 1 (the recording-head position adjustment mechanism) according to the present embodiment having a configuration as described above prevents such a drawback of the comparative example. Specifically, in the example of FIG. 7, the abutting portion 15 is fixed to the second support 20 supporting the first edge of the recording head 10 in the transverse direction by the fixing screw 45 via the positioner 40 and the spacer 41, and the first auxiliary plate 16 is fixed to the second support 20 supporting the second edge of the recording head 10 in the transverse direction by a screw 145. Since the first auxiliary plate 16 is fixed to the second support 20 without being the position thereof adjusted in the longitudinal direction, the recording head 10 is inclined (or twisted) so as to follow the second support 20.

By contrast, in the present embodiment, since only one pin, i.e., the first pin 15*a* among the four pins, i.e., the first pin 15*a* and the second pins 16*a* to 18*a* is fitted to the second support 20 without a clearance (since the abutting portion 15 is provided at only one place), the inclination (or the twist) of the recording head 10 as described above is reduced.

As illustrated in FIG. 3, in the present embodiment, the position of a face X1 in which the first hole 20*x* (see FIG. 5, for example) opens in the second support (the first support portion at the second end) on the upper side in FIG. 3 and the position of a face X2 in which the second hole opens in the second support 20 (the second support portion at the second end) on the lower side in FIG. 3 are different in the longitudinal direction. In other words, the positions of the face X1 and the position of the face X2 in the longitudinal direction are offset from each other. The face X1 is a first face according to embodiments of the present disclosure. The face X2 is a second face according to embodiments of the present disclosure.

Specifically, in the recording head 10, the abutting portion 15 (abutting plate) disposed at the second end in the longitudinal direction and the first edge in the transverse direction is provided on the front side (the left side in FIG. 3) in the installation direction with respect to the first auxiliary plate 16 disposed at the first end in the longitudinal direction and the second edge in the transverse direction.

With this configuration, the operation of adjusting the position of the recording head 10 in the longitudinal direction by increasing or decreasing the number of the spacers 41 described above can be easily performed on the front side (operation side) in the installation direction. Further, since the position of the abutting portion 15 (abutting plate) in the longitudinal direction is offset, the abutting portion 15 is more likely to abut against the positioner 40.

As described above with reference to, for example, FIG. 2, the image forming apparatus 1 according to the present embodiment includes the discharge angle adjusters 56 and 57 to adjust the direction (discharge angle θ) in which droplets are discharged from the recording head 10 by rotating the recording head 10 while being supported by the first support 19 and the second support 20.

Further, in the present embodiment, after the position of the positioner 40 in the longitudinal direction with respect to the second support 20 (supporting member) is adjusted by increasing or decreasing the number of the spacers 41, the adjustment by the discharge angle adjusters 56 and 57 is performed, and then the abutting portion 15 is fixed to the second support 20 via the positioner 40 by screwing (fixed with the fixing screw 45).

First, as illustrated in FIG. 4A and FIG. 4B, the recording head 10 moves to the rear side in the installation direction with respect to the body of the image forming apparatus 1 (the first support 19 and the second support 20) together with the ridged rail 11*a* and the flat rail 11*b* while the ridged rail 11*a* and the flat rail 11*b* are along the rollers 21*a*, 21*b*, and 22. In other words, the recording head 10 moves from the position illustrated in FIG. 4A to the position illustrated in FIG. 4B.

At this time, among the four pins, i.e., the first pin 15*a* and the second pins 16*a* to 18*a*, only one pin, i.e., the first pin 15*a* is fitted to the second support 20 without a clearance therebetween, and the other pins, i.e., the second pins 16*a* to 18*a* are fitted to the first support 19 and the second support 20 with the clearance R therebetween. The positioner 40 is temporarily fixed to the second support 20 by the second fixing screws 46 (see FIG. 5) with the standard number of spacers 41 interposed between the positioner 40 and the second support 20.

Subsequently, the position of the positioner 40 in the longitudinal direction is determined by increasing or decreasing the number of the spacers 41 so that the distance N between the reference portion 100*x* of the jig 100 (see FIG. 4B) installed on the conveyance drum 2 and the reference pin 10*x* (vibration preventing pin) installed in the recording head 10 is a target value. After the position of the positioner 40 is determined, the positioner 40 is screwed and fixed to the second support 20 by the second fixing screw 46 via the spacers 41 whose number has been adjusted. At this time, although the abutting portion 15 is in contact with the positioner 40, the abutting portion 15 is not screwed to the second support 20 by the fixing screw 45.

Subsequently, after the discharge angle θ of the recording head 10 is adjusted by the discharge angle adjusters 56 and 57, the abutting portion 15 is screwed (fixed) to the second support 20 by the fixing screw 45 via the positioner 40 and the one or more spacers 41.

Through such a procedure, the discharge angle θ of the recording head 10 and the position of the recording head 10 in the longitudinal direction are efficiently adjusted.

Modification

Figure 8:
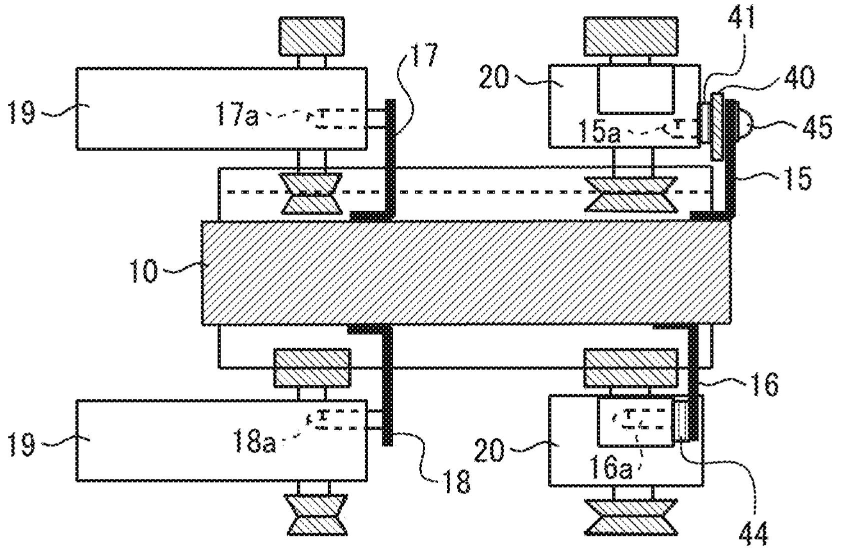
FIG. 8 is a view of a recording-head position adjustment mechanism according to a modification of an embodiment of the present disclosure.

As illustrated in FIG. 8, in the recording-head position adjustment mechanism according to the modification of the above embodiments of the present disclosure, a second spacer 44 is installable in the clearance R between at least one support (e.g., the second support 20 on the lower side in FIG. 8) among the three supports (e.g., the second support 20 on the lower side in FIG. 8 and the two first supports 19) at which the positioner 40 is not installed and the root portion (the first auxiliary plate 16) of the second pin 16*a*.

Specifically, after the position adjustment of the recording head 10 in the longitudinal direction is completed, the second spacer 44 is installed so as to fill the clearance between the second support 20 and the first auxiliary plate 16.

With this configuration, the second supports 20 firmly supports the recording head 10 in an auxiliary manner without causing the inclination or the twist of the recording head 10 as described above with reference to FIG. 7.

The description provided above with reference to FIG. 8 is of a case where the second spacer 44 is installed in the clearance R between at least one of the three supports and the second pin (auxiliary plate). Alternatively, an elastic member such as foamed polyurethane having a relatively small elastic force may be installed instead of the second spacer 44. Also in such a case, substantially the same effects as those described above can be obtained.

Further, the description provided above with reference to FIG. 8 is of a case where the second spacer 44 (or the elastic member) is installed only in the clearance R between the second support 20 and one second pin, i.e., the second pin 16*a* (the first auxiliary plate 16) among the three second pins 16*a* to 18*a* (the first auxiliary plate 16 to the third auxiliary plate 18). Alternatively, the second spacer (or the elastic member) may be installed in the clearances R of two or more second pins (auxiliary plates) among the three second pins 16*a* to 18*a* (the first auxiliary plate 16 to the third auxiliary plate 18).

As described above, the recording-head position adjustment mechanism according to the present embodiment adjusts the position of the recording head 10 that discharges liquid droplets. The recording-head position adjustment mechanism includes the second support 20 that supports the recording head 10, and the positioner 40 on which the abutting portion 15 of the recording head 10 abuts is fixed so as to determine the position of the recording head 10 in the longitudinal direction with respect to the second support 20. The recording-head position adjustment mechanism can adjust the position of the positioner 40 in the longitudinal direction with respect to the second support 20.

Thus, the position of the recording head 10 in the longitudinal direction is accurately adjusted.

In the above-described embodiments, the image forming apparatus 1 includes the six recording heads 10Y, 10M, 10C, 10K, 10S1, and 10S2. Alternatively, as illustrated in FIG. 6 as the modification of the above embodiments of the present disclosure, the number of recording heads is not limited to six but may be any suitable number.

Further, in the above-described embodiments, the plurality of recording heads 10Y, 10M, 10C, 10K, 10S1 and 10S2 are arranged in a radial pattern (on a curved surface) along the outer circumferential surface of the conveyance drum 2. Alternatively, when the sheet P is conveyed on a flat conveyance surface, a plurality of recording heads can be flatly arranged side by side along the flat conveyance surface.

The discharge angle adjusters 56 and 57 are not limited to the above-described embodiments, and various types of configurations can be used.

In such configurations, effects similar to those described above are also attained.

Further, in the above-described embodiments, the recording head 10 and the recording-head position adjustment mechanism including the first support 19 and the second support 20, the base frame 30, the side frame 31, and the side frame 32 can be unitized and construct a recording-head module. In that case, the recording-head module is removably installed in the image forming apparatus 1 in a single construction.

Further, in that case, the image forming apparatus 1 may include the recording-head module in which a plurality of recording-head position adjustment mechanisms and the plurality of recording heads 10Y, 10M, 10C, 10K, 10S1 and 10S2 are unitized.

In such configurations, effects similar to those described above are also attained.

The recording head position adjusting mechanism according to the related art can accurately adjust the tilt (angle) of the recording heads but cannot accurately adjust the positions of the recording heads in the longitudinal direction.

As a result, a drawback sometimes occur that the position of the image formed on the sheet in the longitudinal direction is misaligned from the intended position.

According to one aspect of the present disclosure, a recording-head position adjustment mechanism, a recording-head module, and an image forming apparatus are provided that accurately adjusts the position of a recording head in the longitudinal direction.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Further, the number, position, and shape of the components described above are not limited to those embodiments described above. Desirable number, position, and shape can be determined to perform the present disclosure.

Aspects of the present disclosure may be, for example, as follows.

Aspect 1

According to Aspect 1, a recording-head position adjustment mechanism adjusts a position of a recording head that discharges a liquid droplet.

The recording-head position adjustment mechanism includes a supporting member to support the recording head.

The recording-head position adjustment mechanism includes a positioner to which the abutting portion abuts and is fixed so as to determine a position of the recording head in a longitudinal direction of the recording head with respect to the supporting member.

A position of the positioner in the longitudinal direction with respect to the supporting member is adjustable.

Aspect 2

According to Aspect 2, in the recording-head position adjustment mechanism of the Aspect 1, the positioner is fixable to the supporting member with a spacer interposed between the positioner and the supporting member.

The abutting portion is fixable to the supporting member via the positioner and the spacer.

The position of the positioner in the longitudinal direction with respect to the supporting member is adjusted by adjusting the number of the spacers having the same thickness or by selecting one or more spacers from the spacers having different thicknesses.

Aspect 3

According to Aspect 3, in the recording-head position adjustment mechanism of the Aspect 1 or 2, the supporting member includes: a first support portion at a first end to support a first edge of the recording head in a transverse direction at the first end in the longitudinal direction of the recording head; a second support portion at the first end to support a second edge of the recording head in the transverse direction at the first end in the longitudinal direction of the recording head; a first support portion at a second end to support the first edge of the recording head in the transverse direction at the second end in the longitudinal direction of the recording head; and a second support portion at the second end to support the second edge of the recording head in the transverse direction at the second end in the longitudinal direction of the recording head.

The recording head is removably installed with the second end on a front side in an installation direction of the recording head.

A direction intersecting the longitudinal direction is a direction in which a sheet is conveyed.

The positioner is disposed at one support portion of the first support portion at the first end, the second support portion at the first end, the first support portion at the second end, and the second support portion at the second end.

Aspect 4

According to Aspect 4, in the recording-head position adjustment mechanism of the Aspect 3, the abutting portion includes a first pin that is fitted into a hole formed in the one support portion via a through-hole formed in the positioner.

The recording head includes three second pins having root portions that are respectively fitted with a clearance into three second holes in three support portions other than the one support portion among the first support portion at the first end, the second support portion at the first end, the first support portion at the second end, and the second support portion at the second end.

Aspect 5

According to Aspect 5, in the recording-head position adjustment mechanism of the Aspect 4, the one support portion is the first support portion at the second end.

A position of a face in which the first hole opens at the first support portion at the second end and a position of another face in which one of the three second holes opens at the second support portion at the second end are different in the longitudinal direction.

Aspect 6

According to Aspect 6, in the recording-head position adjustment mechanism of the Aspect 4 or 5, a second spacer is installable in a clearance between at least one of the three support portions and at least one of the three second pins.

Aspect 7

According to Aspect 7, in the recording-head position adjustment mechanism of the Aspect 4 or 5, an elastic member is disposed in a clearance between at least one of the three supporting portions and at least one of the three second pins.

Aspect 8

According to Aspect 8, the recording-head position adjustment mechanism of any one of the Aspect 1 to the Aspect 7 further includes a discharge angle adjuster to swing the recording head supported by the supporting member to adjust a discharge direction in which the liquid droplet is discharged.

An adjustment by the discharge angle adjuster is performed after an adjustment of the position of the positioner in the longitudinal direction with respect to the supporting member is performed, and subsequently the abutting portion is screwed and fixed to the supporting member via the positioner.

Aspect 9

According to Aspect 9, a recording-head module includes a recording head to discharge a liquid droplet and the recording-head position adjustment mechanism of any one of the Aspect 1 to the Aspect 8. The recording head and the recording-head position adjustment mechanism are unitized.

Aspect 10

According to Aspect 10, an image forming apparatus includes the recording-head position adjustment mechanism of any one of the Aspect 1 to the Aspect 8.

The invention claimed is:

1. A recording-head position adjustment mechanism, comprising:

a supporting member supporting a recording head configured to discharge a liquid droplet, the recording head including an abutting portion, the abutting portion including a first pin configured to be fitted into a first hole on the supporting member; and a positioner on which the abutting portion abuts, the positioner to which the abutting portion being fixed so as to determine a position of the recording head in a longitudinal direction of the recording head with respect to the supporting member, wherein a position of the positioner in the longitudinal direction with respect to the supporting member is adjustable, wherein the positioner is fixable to the supporting member with a plurality of spacers interposed between the positioner and the supporting member, wherein the abutting portion is fixable to the supporting member via the positioner and the plurality of spacers, and wherein the position of the positioner in the longitudinal direction with respect to the supporting member is adjustable by adjusting a number of the plurality of spacers having a same thickness or by selecting one or more spacers from the plurality of spacers having different thicknesses.

2. The recording-head position adjustment mechanism of claim 1, further comprising a discharge angle adjuster configured to swing the recording head supported by the supporting member to adjust a discharge direction in which the liquid droplet is discharged, wherein the discharge angle adjuster is configured to adjust the discharge direction after the recording-head position adjustment mechanism adjusts the position of the positioner in the longitudinal direction with respect to the supporting member, and subsequently the abutting portion is screwed and fixed to the supporting member via the positioner.

3. A recording-head module comprising:

a recording head configured to discharge a liquid droplet; and the recording-head position adjustment mechanism of claim 1, wherein the recording head and the recording-head position adjustment mechanism are unitized.

4. An image forming apparatus comprising:

a recording head configured to discharge a droplet; and the recording-head position adjustment mechanism of claim 1.

5. A recording-head position adjustment mechanism, comprising:

a supporting member supporting a recording head configured to discharge a liquid droplet, the recording head including an abutting portion, the abutting portion including a first pin configured to be fitted into a first hole on the supporting member; and a positioner on which the abutting portion abuts, the positioner to which the abutting portion being fixed so as to determine a position of the recording head in a longitudinal direction of the recording head with respect to the supporting member, wherein a position of the positioner in the longitudinal direction with respect to the supporting member is adjustable, wherein the recording head has a first end and a second end opposite to the first end in the longitudinal direction, wherein the supporting member includes:

a first support portion at the first end supporting a third end of the recording head in a transverse direction at the first end;

a second support portion at the first end supporting a fourth end of the recording head in the transverse direction at the first end;

a third support portion at the second end supporting the third end of the recording head in the transverse direction at the second end in the longitudinal direction of the recording head; and a fourth support portion at the second end supporting the fourth end of the recording head in the transverse direction at the second end in the longitudinal direction of the recording head, wherein the recording head is configured to be removably installed with the second end on a front side in an installation direction of the recording head, wherein the longitudinal direction intersects a direction in which a sheet is conveyed, and wherein the positioner is at one support portion of the first support portion at the first end, the second support portion at the first end, the third support portion at the second end, and the fourth support portion at the second end.

6. The recording-head position adjustment mechanism of claim 5, wherein the first pin is configured to be fitted into the first hole in the one support portion via a through-hole in the positioner, and the recording head includes three second pins having root portions that are respectively fitted with a clearance into three second holes in three support portions other than the one support portion among the first support portion, the second support portion, the third support portion, and the fourth support portion.

7. The recording-head position adjustment mechanism of claim 6, wherein the one support portion is the third support portion, and the third support portion has a first face in which the first hole opens, the fourth support portion has a second face in which one of the three second holes opens, and the first face and the second face are at different positions in the longitudinal direction.

8. The recording-head position adjustment mechanism of claim 6, further comprising a second spacer installable in a clearance between at least one of the three support portions and at least one of the three second pins.

9. The recording-head position adjustment mechanism of claim 6, further comprising an elastic member in a clearance between at least one of the three support portions and at least one of the three second pins.

* * * * *